(12) United States Patent
Jacobi et al.

(10) Patent No.: US 8,509,989 B2
(45) Date of Patent: Aug. 13, 2013

(54) MONITORING CONCEPT IN A CONTROL DEVICE

(75) Inventors: Malte Jacobi, Tegernheim (DE); Edwin Böhm, Erlangen (DE)

(73) Assignee: Conti Temic microeletronic GmbH (DE)

( * ) Notice: Subject to any disclaimer, the term of this patent is extended or adjusted under 35 U.S.C. 154(b) by 0 days.

(21) Appl. No.: 13/514,408

(22) PCT Filed: Dec. 20, 2010

(86) PCT No.: PCT/DE2010/001490
§ 371 (c)(1),
(2), (4) Date: Sep. 8, 2012

(87) PCT Pub. No.: WO2011/072661
PCT Pub. Date: Jun. 23, 2011

(65) Prior Publication Data
US 2012/0316728 A1    Dec. 13, 2012

(30) Foreign Application Priority Data
Dec. 18, 2009   (DE) .................... 10 2009 059 088

(51) Int. Cl.
*G06F 11/30* (2006.01)
(52) U.S. Cl.
USPC ........................................ 701/34.4
(58) Field of Classification Search
USPC ........................................ 701/34.4
See application file for complete search history.

(56) References Cited

U.S. PATENT DOCUMENTS

| 5,880,568 | A * | 3/1999 | Bederna et al. ............... 318/563 |
| 6,580,974 | B2 * | 6/2003 | Haag et al. ........................ 701/1 |
| 2005/0251308 | A1 * | 11/2005 | Funcke et al. ................... 701/36 |
| 2009/0217110 | A1 * | 8/2009 | Wisniewski et al. .......... 714/704 |
| 2010/0097018 | A1 * | 4/2010 | Itoh et al. .................... 318/400.3 |

FOREIGN PATENT DOCUMENTS

| DE | 44 38 714 A1 | 5/1996 |
| EP | 2 090 952 A2 | 8/2009 |
| WO | WO 03/056427 A2 | 7/2003 |

OTHER PUBLICATIONS

International Preliminary Report on Patentability for PCT International Application No. PCT/DE2010/001490, dated Jul. 4, 2012.
International Search Report for PCT International Application No. PCT/DE2010/001490, mailed May 18, 2011.

* cited by examiner

*Primary Examiner* — Mary Cheung
*Assistant Examiner* — Anne Mazzara
(74) *Attorney, Agent, or Firm* — RatnerPrestia

(57) ABSTRACT

A monitoring process for monitoring a computing element in a control device of a motor vehicle, wherein the computing element includes three program modules by which the performance of the motor vehicle is influenced. The computing element is executed on a processor, wherein the processor includes a functional computer and a monitoring computer that is physically independent of the functional computer, and the monitoring computer includes two monitoring units that are independent of each other.

13 Claims, 2 Drawing Sheets

MONITORING CONCEPT IN A CONTROL DEVICE

CROSS REFERENCE TO RELATED APPLICATIONS

This application is the U.S. National Phase Application of PCT/DE2010/001490, filed Dec. 20, 2010, which claims priority to German Patent Application No. 10 2009 059 088.9, filed Dec. 18, 2009, the contents of such applications being incorporated by reference herein.

FIELD OF THE INVENTION

The invention relates to a method for monitoring a computing element, to a computing element as well as to a processor and to a monitoring computer for carrying out the method.

BACKGROUND OF THE INVENTION

There are various concepts for designing a control device with a computing element for the use in a motor vehicle in such a manner that the control device is free of single defects or inherently safe. Monitoring in the three-layer concept is one possibility of achieving an inherently safe control device.

A method and a device for controlling a drive unit of a vehicle are known from DE 44 38 714 A1, which is incorporated by reference, wherein the control device for power control has a single computing element only. The computing element performs both switch-off path control and monitoring, wherein operational reliability and service quality are guaranteed by at least two layers for control and monitoring being provided in a single computing element, said layers being independent of each other, wherein the functions for power control are determined in a first layer and said functions, and thus the operatability of the computing element itself, are monitored in a second layer, particularly in cooperation with a monitoring module.

Furthermore, DE 44 38 714 A1 describes a third layer that performs a program flow check of the second layer. This monitoring by the third layer considerably enhances the reliability and service quality of the control device. In particular, the program flow check in the monitoring module is performed in the form of dialog communication.

The three-layer monitoring concept (E-Gas concept) is preferably used in engine control devices of vehicles to monitor electronic engine control systems, wherein the engine control device consists of the so-called functional computer and the monitoring computer. The functional computer and the monitoring computer communicate by means of a dialog method and have separate switch-off paths.

Layer 1 comprises the actual functional module for the functional control of the drive unit of the vehicle and is therefore also referred to as "functional layer". It includes engine control functions, inter alia for the conversion of the requested engine torques, component monitoring, the diagnosis of the input and output quantities, and the control of the system reactions when an error has been detected. Layer 1 is executed on the functional computer.

Layer 2 is also referred to as "function monitoring layer". It comprises the safety module and is also executed on the functional computer. It detects the defective execution of a monitoring-relevant extent of the functional module of Layer 1, inter alia by monitoring the calculated torques or the vehicle acceleration. In the event of an error, system reactions are triggered, e.g., safety-relevant output stages are disabled.

Layer 2 is executed in a functional-computer hardware area that is secured by Layer 3. Layer 3 is also referred to as "computer monitoring layer". It comprises the monitoring module on an independent functional computer with instruction set test, program flow check, ADC test as well as cyclic and complete memory tests of Layer 2. The monitoring module is executed on a functional computer. The monitoring computer that is independent of the functional computer tests the proper processing of the program instructions of the functional computer, said test being a dialog method. In the event of an error, system reactions are triggered independently of the functional computer.

In present-day electronic engine control systems, the entire functional and monitoring software is integrated in a control device. The monitoring concept may also be realized in other vehicle control devices, in particular in gear control devices.

Monitoring concepts in which a monitoring computer performs more than one program flow check in the functional computer by means of a single monitoring unit are known from the state of the art, wherein said single monitoring unit has to synchronize the individual responses from the individual program flow checks as well as to merge the individual responses into an overall response, wherein errors may occur both in the synchronizing operation and in the response merger operation.

BRIEF DESCRIPTION

Therefore, an aspect of the present invention is to improve the known methods for monitoring a computing element in a motor vehicle control device.

According to an aspect of the invention, a method is provided for monitoring a computing element in a control device of a motor vehicle, wherein the computing element comprises three program modules by which the performance of the motor vehicle is influenced, wherein the computing element generates, by the program modules and dependently on at least one input quantity, at least one quantity for controlling at least one function of the motor vehicle, wherein: the first program module is a functional module for the functional control of the motor vehicle, the second program module is a safety module for checking the functional module, the third program module is a monitoring module at least for checking the safety module, wherein the monitoring module comprises two monitoring elements that are independent of each other, and one state machine each for configuring an associated monitoring unit is passed through in the computing element when the control device is switched on, and the monitoring units start monitoring by the respective monitoring element if both state machines have been passed through successfully.

The inventive computing element in the motor vehicle control device comprises three software program modules: a functional module for the functional control of the motor vehicle, a safety module for checking the functional module, and a monitoring module at least for checking the safety module.

The core of an aspect of the invention consists in the monitoring module comprising two monitoring elements that are independent of each other and are realized in the form of software, wherein each monitoring element is assigned to one monitoring unit each, said monitoring units being realized in the form of hardware.

In this manner, software tasks that are completely different from each other in time can be monitored. The safety-critical path is not enabled unless both of them deliver correct responses in the correct time window.

Particularly when the control device is switched on, one state machine each for configuring an associated monitoring unit is passed through in the computing element. A state machine is a behavioural model consisting of states, state transitions and actions. A state stores the information about the past and reflects the changes in the input that have occurred in the period from the system start-up till the current moment. A state transition shows a change in the state of the state machine and is described by logical conditions that must be fulfilled in order to make the transition possible. An action is the output of the state machine that occurs in a certain situation.

If both state machines have been passed through successfully, the two monitoring units advantageously start the monitoring of the computing element by means of the respective monitoring element.

As a first check, the first monitoring unit performs particularly a memory test and a program flow check in the safety module by means of the first monitoring element. Furthermore, the second monitoring unit performs, as a second check, particularly an instruction set test and an ADC test in the monitoring module by means of the second monitoring element. Advantageously, the respective checks are performed in so-called test paths.

A switch-off path check particularly guarantees that the functional computer or the monitoring computer can correctly disable the safety-relevant output stages in the event of an error, for example.

It is particularly important to emphasize that one error counter each is operated in the event of an error occurring in one of the two checks and a system reaction is triggered by the monitoring computer independently of the functional module when freely programmable error reaction thresholds are exceeded.

Such a system reaction may consist in putting the vehicle in a restricted emergency mode that enables the vehicle to only just roll to a stop on the hard shoulder of a roadway, for example.

For enhanced safety, error counting is advantageously asymmetrical, i.e., counting up twice in the event of a wrong response occurring in the dialog method, but counting down only once in the event of a correct response.

Preferably, the corresponding monitoring unit is configured in the computing element when the control device is initialized. In this process, e.g., a response time and a response time window of the dialog method as well as a disable threshold for the safety-relevant output stages and a reset threshold together with a reset enable are fixed in each case apart from other parameters, wherein it is quite possible that the parameters are not the same for each monitoring unit. Alternatively, both monitoring units may be equally configured.

Particularly advantageously, configuring a corresponding monitoring unit is only possible in a corresponding NIT state and only defined state transitions are permitted in a state machine. Furthermore, particularly a return to the NIT state is only performed via a state RESET, thereby preventing the parameters from being intentionally or unintentionally changed later.

A further aspect of the invention consists in providing a processor with an above-described computing element in a control device of a motor vehicle, said processor being improved as against the cited state of the art.

According to an aspect of the invention, this is achieved by a processor with a computing element, wherein the processor essentially comprises a functional computer and a monitoring computer, and wherein the functional module, the safety module and the monitoring module are executed on the functional computer and the monitoring computer communicates with the functional computer by means of a dialog method via an interface, wherein the functional computer and the monitoring computer are physically independent of each other and the monitoring computer comprises two monitoring units that are independent of each other, wherein for monitoring the proper processing of the program instructions of the functional computer, one check each can be performed in the functional computer by each monitoring unit.

As set out in detail above, the computing element of the control device essentially comprises the three program modules "functional module", "safety module" and "monitoring module", and the computing element is executed on the processor. The processor is particularly subdivided into a functional computer and a monitoring computer, wherein the functional module, the safety module and the monitoring module are executed on the functional computer. The monitoring computer usually communicates with the functional computer by means of a dialog method via an interface.

The core of an aspect of the invention consists in the functional computer and the monitoring computer being physically independent of each other in particular and the monitoring computer furthermore comprising two monitoring units that are functionally independent of each other. For monitoring the proper processing of the program instructions of the functional computer, one check each can be advantageously performed in the functional computer by each monitoring unit, whereby the checking method can be advantageously accelerated and made safer.

BRIEF DESCRIPTION OF THE DRAWINGS

In the following description, the features and details of aspects of the invention will be explained in greater detail on the basis of exemplary embodiments in connection with the attached drawings, wherein the features and contexts described in individual variants are applicable in principle to all exemplary embodiments. In the drawings.

DETAILED DESCRIPTION OF THE INVENTION

Figure 1:
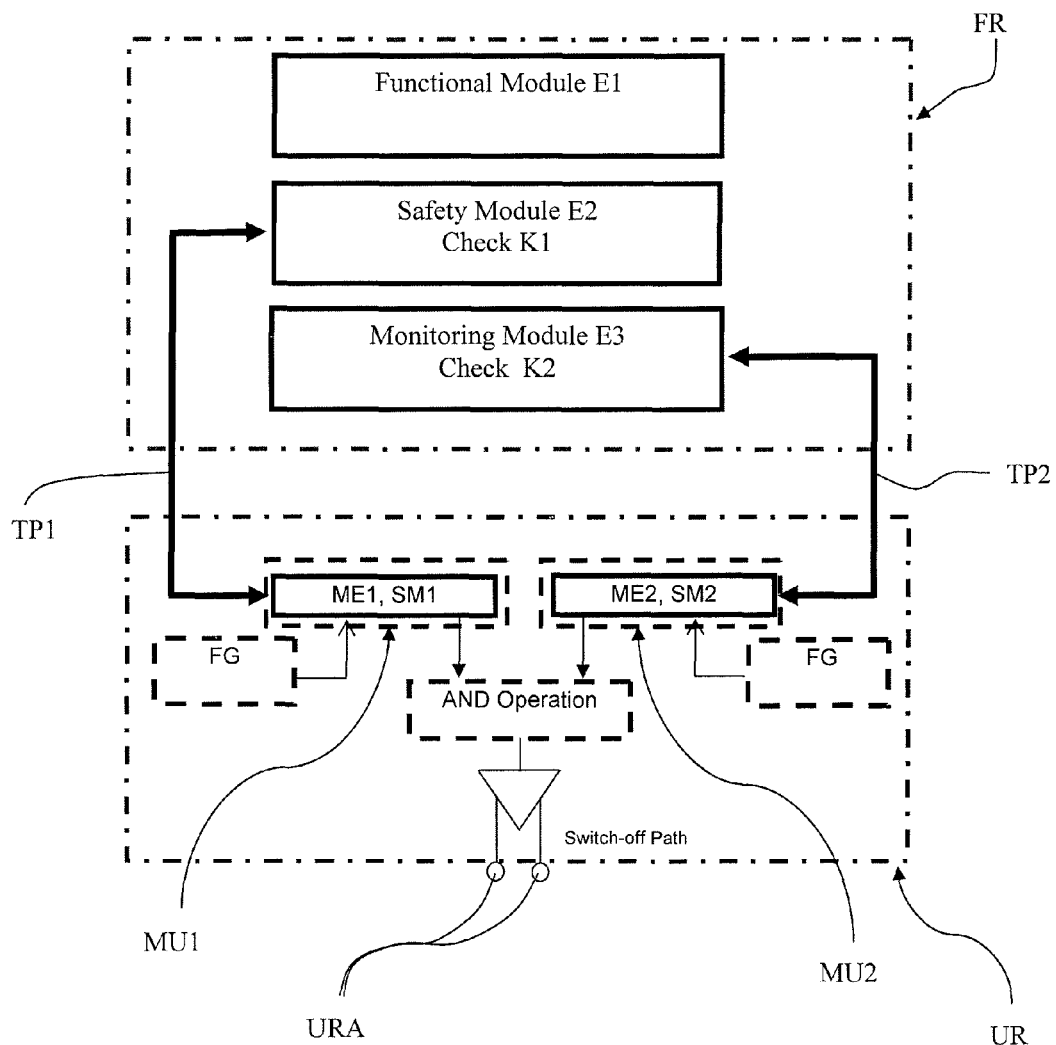
FIG. 1 shows a three-layer concept subdivided into modules (software) and computers (hardware)

In FIG. 1, the boxes marked with dot-dash lines or dashed lines show one hardware component each. The boxes marked with continuous lines show one software component each. The straight arrows between the boxes show one data exchange each.

FIG. 1 shows a three-layer monitoring model that is basically known from the E-Gas concept, said model being used, e.g., in an engine control device or in a gear control device in motor vehicles.

The first box marked with a dot-dash line indicates the functional computer (FR) of the processor. The second box marked with a dot-dash line indicates the monitoring computer (UR) of the processor. The functional computer (FR) and the monitoring computer (UR) are arranged on the processor in such a manner that they are physically separate from each other. The monitoring computer (UR) may be an ASIC computer, for example. The three program modules functional module (E1), safety module (E2) and monitoring module (E3) are executed on the functional computer (FR).

The functional module (E1) represents Layer 1 of the E-Gas concept, which Layer 1 is also referred to as "functional layer". Layer 1 is particularly used for the functional control of the drive unit of the vehicle. As explained above, Layer 1 includes, e.g., engine control functions, inter alia for the conversion of the requested engine torques, component monitoring, the diagnosis of the input and output quantities, and the control of the system reactions when an error has been detected.

The safety module (E2) represents Layer 2 of the E-Gas concept, which Layer 2 is also referred to as "function monitoring layer". Layer 2 detects the defective execution of a monitoring-relevant extent of the functional module (E1) of Layer 1. In particular, the calculated torques or, e.g., the vehicle acceleration are monitored. The occurrence of an error particularly results in system reactions being triggered. The safety module (E2) is primarily executed in a hardware area of the functional computer (FR), said hardware area being secured by the monitoring module (E3).

The monitoring module (E3) represents Layer 3 of the E-Gas concept, which Layer 3 is also referred to as "computer monitoring layer". The monitoring module (E3) is particularly executed on the functional computer (FR) that is independent of the monitoring computer (UR). The monitoring computer (UR) tests the proper processing of the program instructions of the functional computer (FR), said test being at least one dialog method, for example. The occurrence of an error particularly results in system reactions being triggered independently of the functional computer (FR).

The monitoring computer (UR) essentially comprises two monitoring units (MU1, MU2) that are independent of each other. On each monitoring unit (MU1, MU2), a corresponding monitoring element (ME1, ME2) is executed for checking (K1, K2) the safety module (E2) and the monitoring module (E3), respectively.

For example, the first monitoring unit (MU1) performs, as a first check (K1), a memory test and a program flow check in the safety module (E2) by means of the first monitoring element (ME1) via the first test path (TP1).

The second monitoring unit (MU2) preferably performs, as a second check (K2), an instruction set test and an ADC test in the monitoring module (E3) by means of the second monitoring element (ME2) via the second test path (TP2), said second check (K2) being performed parallel to and independently of check (K1). The second check (K2) could also be performed on the first monitoring unit (MU1) by means of the first monitoring element (ME1) via the first test path (TP1), and vice versa.

In particular, the aforementioned program flow check is performed in the form of a dialog between a monitoring unit (MU1, MU2) and the functional computer (FR). The corresponding inquiries are generated, e.g., in an inquiry generator (FG) that is assigned to a monitoring element (ME1, ME2). The inquiry generators (FG) are equally designed, but the inquiries are selected at random so that the inquiries of the monitoring unit (MU1) and those of the monitoring unit (MU2) practically differ from each other in each case.

In the event of an error occurring during the check (K1, K2), one error counter each is advantageously incremented. When a corresponding freely programmable error reaction threshold is exceeded, a system reaction is triggered particularly by the monitoring module (E3) independently of the functional module (E1). The freely programmable error reaction thresholds may be different for different system reactions, such as disabling the safety-relevant output stages or resetting the functional computer (FR). When one of the monitoring units (MU1, MU2) generates a reset, the complete system including the state machine (SM1, SM2) and the functional computer (FR) is reset. For example, configuration could also be such that only errors of the monitoring unit (MU1) result in a reset and errors of the monitoring unit (MU2) only result in the safety-relevant output stage being disabled.

Furthermore, the generation of a reset instruction as an error reaction may be optionally enabled or disabled.

Advantageously, the outputs (URA) of the monitoring computer (UR) are complementary outputs. In the event of a total loss of power of the monitoring computer (UR) that is, e.g., an ASIC computer (caused by, e.g., a chip breakdown or a latchup, i.e., a transition of a semiconductor component to a low-impedance state), it is assumed that all outputs of the monitoring computer (UR) are simultaneously on a high level or simultaneously on a low level. In such a case, the complementary outputs, together with external wiring (not shown), make sure that the safety path of the system, and thus the safety-relevant output stages of the system, are disabled. The external wiring consists of, e.g., resistors and transistors and makes sure that only just one combination of the complementary outputs enables the safety-relevant output stages.

Figure 2:
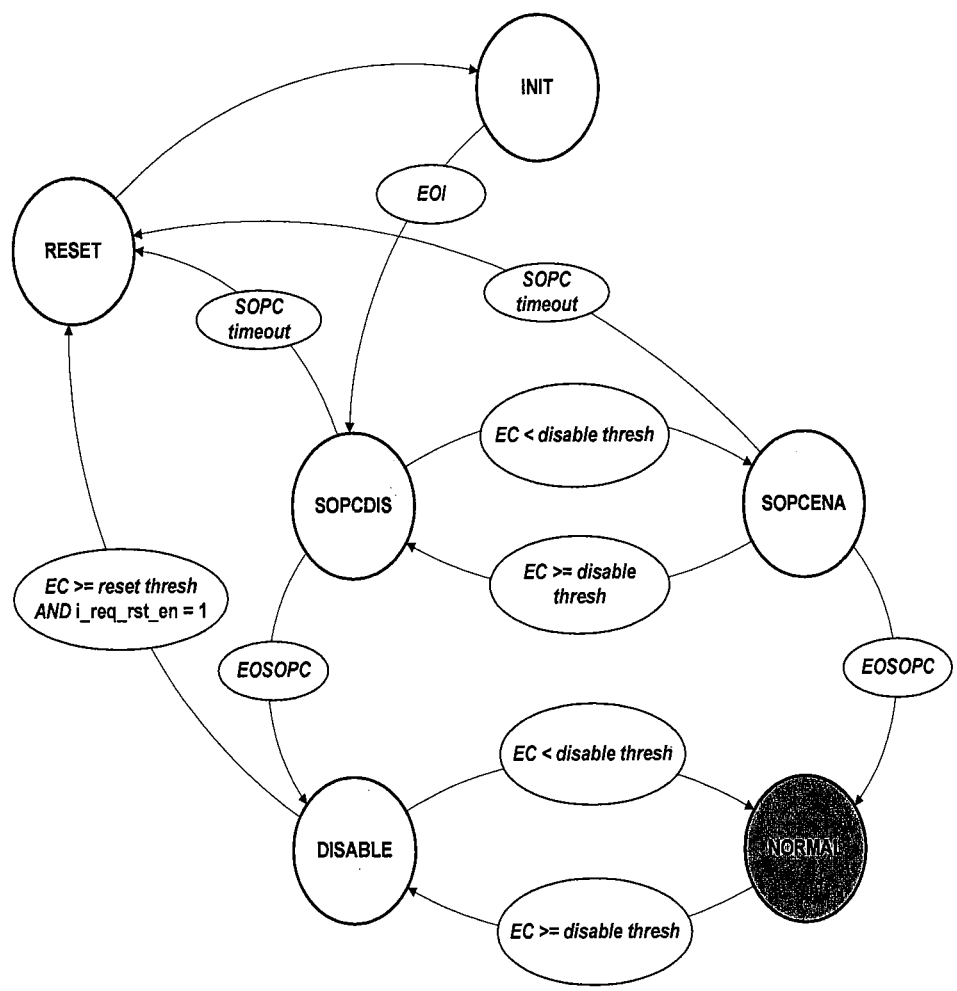
FIG. 2 shows a state machine with states, transitions and conditions.

FIG. 2 shows a state machine. Advantageously, the state machine can be realized with little hardware, wherein this embodiment of the state machine is faster, safer and less interference-prone than a state machine realized in the form of software. Furthermore, it cannot be manipulated. As set out in the introductory part of the description, a state machine is a behavioural model consisting of states, state transitions and actions. A state stores the information about the past and reflects the changes in the input that have occurred in the period from the system start-up till the current moment. A state transition shows a change in the state of the state machine and is described by logical conditions that must be fulfilled in order to make the transition possible. An action is the output of the state machine that occurs in a certain situation. In digital circuits, the state machines are mainly realized by stored program control systems, logic gates, flip-flops or relays. For the implementation of the hardware, one usually uses a register for storing the state variables, a logic unit that selects the state transitions, and a further logic unit that is responsible for the output. A specific state machine (SM1, SM2) is assigned to each monitoring element (ME1, ME2).

The (INIT) state is taken on when the control device is initialized or after a reset of the control device. In the (INIT) state, the monitoring unit (MU1, MU2) is configured by the functional module (E1) via a communications interface between the monitoring computer (UR) and the functional computer (FR), wherein particularly the response time, the response time window, the error reaction threshold, especially the disable threshold (thresh) and the reset threshold (reset thresh) are fixed.

The response time that is fixed while the state machine (SM1, SM2) is passed through is essentially freely configurable and is usually in the range between 1 ms and 255 ms.

In particular, the response time window is also fixed in the state machine and is primarily in the range between 1 ms and 255 ms. In particular, the ratio that the response time bears to the response time window is freely scalable.

Furthermore, the initial value of the error counter is automatically set above the disable threshold (thresh) in order to make sure that the error counter remains disabled in the (NIT) state. By action (EOI) (=End Of NIT State), the configuration of the monitoring element (ME1, ME2) is completed and cannot be changed anymore. Thus, the state transition to state (SOPCDIS) (=Switch Off Path Check Disable) is accomplished, wherein (SOPC) is the switch-off path check, wherein a switch-off path check can guarantee that the functional computer or the monitoring computer can correctly disable the safety-relevant output power stages in the event of an error, for example. In this state, the output power stages are not enabled, yet.

During the switch-off path check, states (SOPCDIS) and (SOPCENA) are taken on in the state machine. The output stages are disabled in the first state and enabled in the second state. The advantage of this solution consists in the fact that the responses can be sent during the switch-off path check as fast as possible with no consideration for the response time window. Thus, the run-up time of the system can be kept short.

When state (SOPCDIS) is reached, the SOPC timer is started among other things. The SOPC timer measures the time until instruction (EOSOPC) (=End of SOPC). If the check takes too long, it is aborted and the transition from state (SOPCDIS) to state (RESET) is executed by means of action (SOPC timeout).

In state (SOPCDIS), the dialog between the monitoring computer (UR) and the functional computer (FR) preferably starts without any time restriction in order to perform the check as fast as possible, i.e., the response time window is open. The error counter is incremented in the event of a wrong response. If the error counter is below a disable threshold (thresh), the transition to state (SOPCENA) (=Switch Off Path Check Enable) is executed, in particular immediately, via condition (EC<disable thresh). Thus, the output power stages are enabled.

The transition from state (SOPCDIS) to state (DISABLE) is executed via condition (EOSOPC) (=End Of Switch Off Path Check) that is triggered by the communications interface between the functional computer (FR) and the monitoring computer (UR). The output power stages remain disabled, as defined in state (SOPCDIS). The only condition is the correct command before condition (SOPC timeout) expires.

When state (SOPCENA) is reached, in particular starting from state (SOPCDIS), the SOPC timer advantageously runs on. The dialog between the monitoring computer (UR) and the functional computer (FR) runs on without any time restriction in this state, too. When the error counter has reached or exceeded a disable threshold (thresh), a transition back to state (SOPCDIS) is particularly executed via condition (EC>=disable thresh).

If the switch-off path check takes too long, it is aborted and the transition from state (SOPCENA) to state (RESET) is executed via condition (SOPC timeout). The following transition from state (RESET) to state (INIT) is executed automatically.

The transition from state (SOPCENA) to state (NORMAL) is mainly executed via condition (EOSOPC) that is triggered by the communications interface again.

In state (NORMAL), the output power stages are enabled unless they were enabled in a previous state. In this state, the dialog between the monitoring computer (UR) and the functional computer (FR) is continued, wherein particularly the count of the error counter is taken over from the previous state. In contrast to states (SOPCENA) and (SOPCDIS) of the switch-off path check, there is preferably a time restriction with regard to the response time and the response time window in this state.

For ensuring runtime monitoring of the operating system of the functional computer, the response must not come too early or too late. The response time is the latest possible moment for sending the response. Secondly, a "closed window" is configured. A response must not be sent here. The difference between the response time and the "closed window" is the "open window" (response time window).

The response time and the response time window were programmed before in state (INIT). The error counter is advantageously incremented both in the event of a wrong response and in the event of the response time or the response time window being exceeded. In the event of a disable threshold (thresh) being reached or exceeded, the transition to state (DISABLE) is executed via condition (EC>=disable thresh).

In state (DISABLE), the output power stages are disabled. In this state, the dialog between the monitoring computer (UR) and the functional computer (FR) is continued with the count of the error counter being unchanged. There is a time restriction with regard to the response time and the response time window in this state, too. The error counter is incremented, also in this state, both in the event of a wrong response and in the event of the response time or the response time window being exceeded. In the event of the threshold (thresh) being fallen below, the transition back to state (NORMAL) is executed via condition (EC<disable thresh). In state (NORMAL), the output power stages are enabled again.

As soon as the error counter has reached a reset threshold (reset thresh) in state (DISABLE) and the register for reset enable has the preset value of 1, the transition to state (RESET) is executed via condition (EC>=reset thresh AND i_req_rst_en=1). The following transition from state (RESET) to state (INIT) is executed automatically again.

The state (SOPCENA) may be omitted in the state machine in order to make overall execution in the state machine even faster. There will be no fast switch-off path check in this case.

If both state machines have been passed through successfully, the two monitoring units advantageously start the monitoring of the computing element by means of the respective monitoring element in state (NORMAL).

In summary, it can be concluded that the inventive monitoring concept for monitoring a computing element in a control device of a motor vehicle represents an improvement as against the known monitoring concepts with regard to swiftness, programming effort and safety.

The invention claimed is:

1. A method for monitoring a computing element in a control device of a motor vehicle, wherein the computing element comprises three program modules by which a performance of the motor vehicle is influenced, wherein the computing element generates, by the program modules and dependently on at least one input quantity, at least one quantity for controlling at least one function of the motor vehicle, wherein:

the first program module is a functional module for functional control of the motor vehicle, the second program module is a safety module for checking the functional module, the third program module is a monitoring module at least for checking the safety module, wherein the monitoring module comprises a first monitoring unit including a first monitoring element for monitoring the second program module, and a second monitoring unit including a second monitoring element for monitoring the third program module, the first monitoring unit being independent of the second monitoring unit and being configured by respective and independent state machines to monitor the respective second and third program modules if both state machines are passed through successfully.

2. Method according to claim 1, wherein the first monitoring unit performs a first check in the safety module by the first monitoring element and the second monitoring unit performs a second check in the monitoring module by the second monitoring element, said checks being performed in test paths.

3. The method according to claim 1, wherein the first monitoring unit performs a memory check and a program flow check in the safety module as a first check.

4. The method according to claim 1, wherein the second monitoring unit performs an instruction set test and an analog to digital converter (ADC) test in the monitoring module as a second check.

5. The method according to claim 1, wherein an error counter is operated when an error is detected by the first monitoring element or the second monitoring element, and a system reaction is triggered by the monitoring module independently of the functional module when freely programmable error reaction thresholds (thresh, reset thresh) are exceeded.

6. The method according to claim 1, wherein a response time, a response time window, a disable threshold and a reset threshold are fixed in the computing element apart from other parameters when the corresponding monitoring unit is configured when the control device is initialized, wherein it is possible that the parameters are not the same for each monitoring unit.

7. The method according to claim 1, wherein both monitoring units are equally configured.

8. The method according to claim 1, wherein configuring the corresponding monitoring unit in the associated state machine is only possible in a corresponding state.

9. The method according to claim 1, wherein only defined state transitions are permitted in a state machine and a return to the state is only performed by a reset.

10. The method according to claim 1, wherein error counting is performed asymmetrically.

11. A computing element including three program modules by which a performance of the motor vehicle is influenced, and wherein the computing element generates, by the program modules and dependently on at least one input quantity, at least one quantity for controlling at least one function of the motor vehicle, wherein:
the first program module is a functional module for functional control of the motor vehicle,
the second program module is a safety module for checking the functional module,
the third program module is a monitoring module at least for checking the safety module, wherein
the monitoring module comprises a first monitoring element assigned to a first monitoring unit for monitoring the second program module, and a second monitoring element assigned to a second monitoring unit for monitoring the third program module, the first monitoring unit being independent of the second monitoring unit and being configured by respective and independent state machines to monitor the respective second and third program modules if both state machines are passed through successfully.

12. A processor with a computing element, the computing element including:
three program modules by which a performance of the motor vehicle is influenced, and wherein the computing element generates, by the program modules and dependently on at least one input quantity, at least one quantity for controlling at least one function of the motor vehicle, wherein:
the first program module is a functional module for functional control of the motor vehicle,
the second program module is a safety module for checking the functional module,
the third program module is a monitoring module at least for checking the safety module,
wherein the monitoring module comprises two independent monitoring elements that configure the associated monitoring units, wherein the processor comprises a functional computer and a monitoring computer, and wherein the functional module, the safety module and the monitoring module are executed on the functional computer and the monitoring computer communicates with the functional computer by a dialog method via an interface,
wherein the functional computer and the monitoring computer are physically independent of each other and the monitoring computer comprises two monitoring units that are independent of each other, and
wherein for monitoring the proper processing of the program instructions of the functional computer, one check each can be performed in the functional computer by each monitoring unit.

13. The processor according to claim 12, wherein for monitoring the proper processing of the program instructions of the functional computer, one check each can be performed in a functional computer outside the monitoring computer by each monitoring unit.

* * * * *